Jan. 12, 1926.
T. F. HAYS
1,569,015
BOILER AND TANK STUD FITTING
Filed April 18, 1923
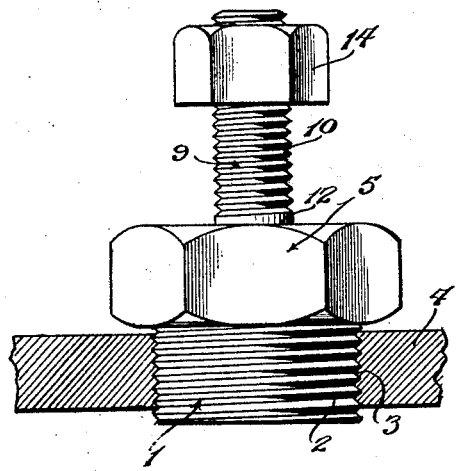
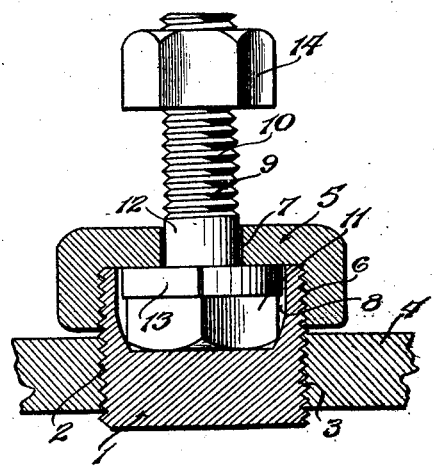
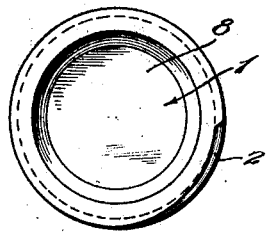
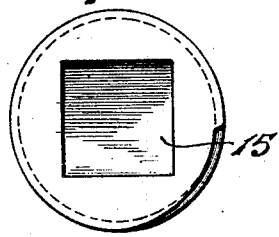
Inventor
T. F. Hays.
By Lacey & Lacey, Attorneys Patented Jan. 12, 1926.

1,569,015

UNITED STATES PATENT OFFICE.

THOMAS F. HAYS, OF NORTH LITTLE ROCK, ARKANSAS, ASSIGNOR OF ONE-FOURTH TO JAMES W. DELANEY, OF LITTLE ROCK, ARKANSAS.

BOILER AND TANK STUD FITTING.

Application filed April 18, 1923. Serial No. 632,917.

*To all whom it may concern:*

Be it known that I, THOMAS F. HAYS, a citizen of the United States, residing at North Little Rock, in the county of Pulaski and State of Arkansas, have invented certain new and useful Improvements in Boiler and Tank Stud Fittings, of which the following is a specification.

This invention relates to an improved stud fitting for boilers, tanks, and the like.

Where it becomes necessary to mount a pressure gage, air pump, or other appliance or instrument, upon a steam boiler, or a tank, it has heretofore been customary to form a tapped hole in the wall of the boiler shell or tank and then thread a stud into the hole and mount the gage or other device upon the stud. However, this has been found to be unsatisfactory for the reason that in a short time the boiler or tank will leak about the stud, particularly if it should become necessary to remove the stud, for any reason, and then replace the same. When such leakage occurs, it becomes necessary to enlarge the tapped hole and employ a new stud of a larger diameter than the original one to fit the said hole. Therefore, it is one of the important objects of the present invention to provide a stud fitting so designed and constructed as to provide for the mounting of attachment studs upon the walls of a boiler shell or tank in a more secure manner than has heretofore been possible, and at the same time provide for removal and replacement of the stud at any time this may become necessary, without putting the boiler or tank out of operation and without the necessity of enlarging and retapping the hole or resorting to any other expediency to avoid leakage.

In the accompanying drawing:

Figure 1 is a view in elevation of the stud fitting embodying the invention mounted in the shell of a boiler or tank;

Figure 2 is a diametric sectional view through the fitting, the stud however being shown in elevation;

Figure 3 is an end end view of the bushing of the fitting;

Figure 4 is a similar view illustrating a modified form of bushing;

Figure 5 is a view similar to Figure 2 illustrating a modification of the invention.

In that form of the invention shown in Figures 1, 2 and 3, the stud fitting comprises, among other elements, a bushing which is indicated in general by the numeral 1. This bushing is of cylindrical form and is exteriorly threaded as indicated by the numeral 2, thereby adapting it to be fitted into a tapped opening 3, formed in the shell 4 of a boiler, tank, or other structure upon which gages or other devices are to be mounted. The bushing 1 may be merely threaded into the tapped opening 3 or after being so fitted in the opening, it may be welded in place either at the exterior or at the interior of the shell 4. In any event a portion of the bushing will project outwardly from the shell, and the bushing will constitute a permanent fixture. That is to say the bushing is not intended to be removed and replaced in the vent removal of the stud of the fitting becomes necessary for any reason, but it remains permanently within the opening 3 in the shell 4.

In this form of the invention, a cap 5 is employed and is interiorly threaded as indicated by the numeral 6 thus adapting it to be fitted onto the projecting portion of the bushing 1 as clearly shown in Figures 1 and 2 of the drawing. The cap 5 is provided centrally with an opening 7 which is preferably of circular form, and this opening communicates with a recess 8 which is formed in the outer end of the bushing 1. In the form shown in Figures 2 and 3, the recess 8 in the bushing is of circular form and its circumferential wall is concentric to the wall of the opening 7 in the cap 5, the said opening 7 being, however, of less diameter than the recess.

The stud of the fitting is indicated by the numeral 9 and the said stud comprises a shank which is threaded as at 10 for a portion of its length and is provided at one end with a head indicated by the numeral 11. For a portion of its length the shank of the stud may be left unthreaded as indicated by the numeral 12, if desired, and in fact this stud may take the form of an ordinary headed bolt. The stud 9 has its shank fitted through the opening 7 in the cap 5, and with its threaded portion projecting beyond the cap, and the head 11 of the stud is received within the recess 8 when the cap 5 is threaded into place upon the bushing, as clearly shown in Figure 2. If desired a split spring washer 13 may be applied to the shank of the stud and confined between the head 11 of the stud and the inner side of the cap 5. It will be understood that the spring washer 13 may be omitted if this should be found desirable. A nut 14 is threaded onto the stud 9 and it will be evident that before applying this nut, any bracket or other mounting or securing device for the instrument to be mounted may be fitted onto the stud, after which the nut may be applied to the stud and tightened to secure said bracket or other securing device in place. Inasmuch as the stud is maintained entirely out of contact with the water or other contents of the tank or the like upon which the fitting is mounted, there will be no likelihood of corrosion of the stud such as would cause leakage. It will be evident that studs of different sizes may be substituted one for another by merely removing the cap 5 and interchanging the studs, this being accomplished without in any manner disturbing the bushing 1.

As previously stated, in the form of the invention shown in Figures 1, 2 and 3 of the drawing, the recess 8 in the bushing 1 is of circular form, but as illustrated in Figure 4, this recess, indicated in this instance by the numeral 15, may be of rectangular or other polygonal contour thus adapting the bushing for the application thereto of a suitable wrench in fitting the bushing into the shell.

In the form of the invention shown in Figure 5 of the drawing, the bushing is indicated by the numeral 16 and is exteriorly threaded as at 17 as in the previously described form. In this case, however, instead of providing a recess corresponding to the recess 8, the bushing is formed axially in its outer end with a threaded bore 18 which terminates short of its inner end, and the stud, which in this instance is indicated by the numeral 19, is threaded directly into this bore. This simplified structure permits of dispensing with the cap 5 and at the same time presents all of the advantages present in the first described embodiment of the invention. It will be observed that both in the case of the recess 8 and the threaded bore 18, the parts constitute a socket in which one end of the stud is removably retained.

Having thus described the invention, what is claimed as new is:

1. A stud fitting comprising a bushing to be permanently fitted into a boiler shell or the like and having a recess in its outer end, a cap removably fitted onto the bushing and having a central opening, and a threaded stud fitted through the opening in the cap and having a head received within the recess.

2. A stud fitting comprising a bushing exteriorly threaded to be permanently fitted into a boiler shell or the like and having a recess in its outer end, a cap removably threaded onto the said outer end of the bushing and having a central opening, and a threaded stud having its shank fitting through the opening in the cap and provided with a head received within the recess and confined by the cap.

3. A stud fitting comprising a bushing exteriorly threaded to be permanently fitted into a boiler shell or the like and having a socket in its outer end, a cap removably fitted onto the said outer end of the bushing and having a central opening, a threaded stud having its shank fitted through the opening in the cap and provided with a head received within the recess and confined by the cap, and a spring washer upon the shank of the stud between the cap and the head of the stud.

In testimony whereof I affix my signature.

THOMAS F. HAYS. [L. S.]